(12) United States Patent
Wang

(10) Patent No.: US 7,685,196 B2
(45) Date of Patent: Mar. 23, 2010

(54) METHODS AND SYSTEMS FOR TASK-BASED SEARCH MODEL

(75) Inventor: Yanxin Emily Wang, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 11/683,297

(22) Filed: Mar. 7, 2007

(65) Prior Publication Data
US 2008/0222184 A1    Sep. 11, 2008

(51) Int. Cl.
*G06F 17/30*    (2006.01)
(52) U.S. Cl. ....................................................... 707/722
(58) Field of Classification Search .................. 707/1, 707/2, 102, 722
See application file for complete search history.

(56) References Cited

U.S. PATENT DOCUMENTS

| | | | |
|---|---|---|---|
| 6,829,599 B2 | 12/2004 | Chidlovskii | |
| 6,873,982 B1 | 3/2005 | Bates et al. | |
| 7,124,093 B1 | 10/2006 | Graham et al. | |
| 7,133,879 B1 * | 11/2006 | Goldsmith et al. | 707/102 |
| 7,158,966 B2 | 1/2007 | Brill et al. | |
| 2002/0169743 A1 * | 11/2002 | Arnold et al. | 707/1 |
| 2005/0125382 A1 | 6/2005 | Karnawat et al. | |
| 2005/0177561 A1 | 8/2005 | Ramanathan et al. | |
| 2006/0026147 A1 | 2/2006 | Cone et al. | |
| 2006/0155751 A1 | 7/2006 | Geshwind et al. | |
| 2006/0241908 A1 | 10/2006 | Zheng et al. | |
| 2006/0265368 A1 | 11/2006 | Nickerson et al. | |

OTHER PUBLICATIONS

European Search Report for App. No. 08152383.9-2221; Jun. 11, 2008; 11 pages.
Gary Walker, "IT Problem Management", Mar. 7, 2001, 18 pages.
Francoise Tourniaire, "Just Enough CRM", Feb. 24, 2003, 8 pages.
European Search Report; 08152383.9-2221; Jun. 11,2008; 37 pages.

* cited by examiner

*Primary Examiner*—Etienne P LeRoux
(74) *Attorney, Agent, or Firm*—Armstrong Teasdale LLP

(57) ABSTRACT

Methods and systems for a computer-implemented method for managing service requests from a customer by a business entity are provided. The method includes generating a project folder relating to a first service request received from the customer by a first user, searching a plurality of information sources using keywords relating to the customer request, storing working documents responsive to the search request in the project folder that is accessible by at least one of the first user and a second user, and organizing the project folder in a database with meta data to describe the task content such that at least one of the first user and the second user can later locate the working documents during a subsequent search for a second service request similar to the first service request using the project folder such that an amount of time to answer the similar service request is facilitated being reduced.

21 Claims, 15 Drawing Sheets

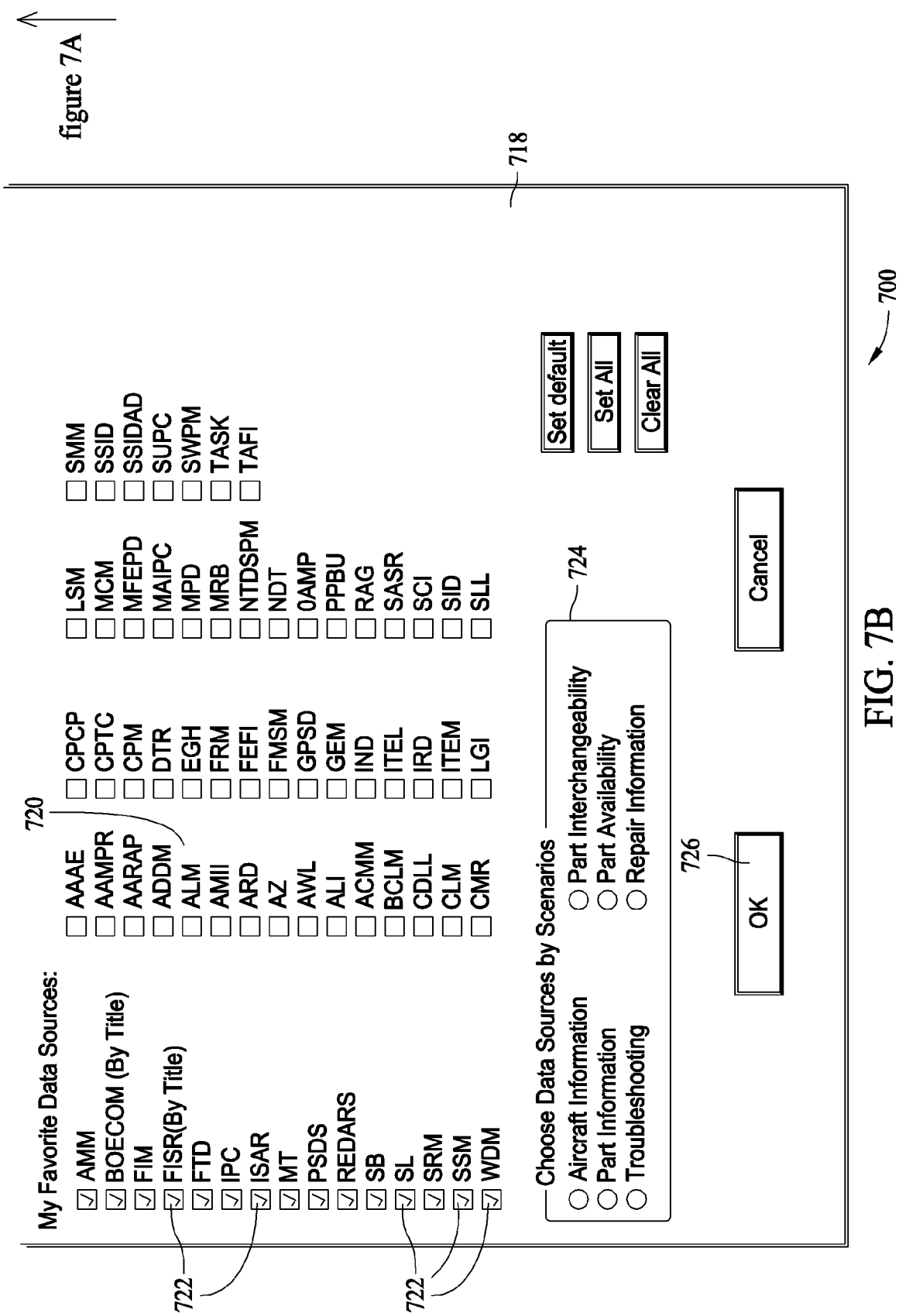

METHODS AND SYSTEMS FOR TASK-BASED SEARCH MODEL

BACKGROUND

Embodiments of the disclosure relate generally to methods and systems for collaborative information searching and more particularly, to methods and systems for task-based searching for similar information requests.

At least some known search tasks are diverse in that each request is limited in its relation to previous searches performed. Other known searches occur with regularity, for example, customer support engineers frequently receive service requests from customers regarding similar problems or requests for information that pertain to largely the same group of products or systems, namely the products and/or systems acquired from the same manufacturer. Because such products and systems may be large and complex, customers seek assistance from the manufacturer for information. Service requests from customers tend to be similar, therefore the search queries made by support engineers tend to be similar to search queries made previously by the support engineer or other support engineers receiving a similar service request. Support engineer tasks include searching a wide variety of data sources, different information repositories, and past solutions to answer customer requests. The user search model of, for example, support engineers necessitates a new search support method that makes the search more efficient.

Some known search engines provide users an ability to view previous search histories, but this does not provide users an ability to view the searches for each individual task, the conclusion and the information collected in the search task, and view the searches other users performed for similar tasks. Other known search engines provide a tagging functionality such that users can tag a document with their own comments and share with others. But users have to spend time tagging documents and the comments add more information to the search result documents that users need to evaluate and analyze. Still other messaging systems permit subsequent users to see previous service request messages and replies not the search criteria for searches performed to locate the responsive information.

Support engineer search activities focus on each incoming service request. Standard search tools are inconvenient to use fulfilling a service request and when the engine attempts to review the searches that were performed for a similar previous service request and the documents that were found to be useful in the previous search results. Searches that were performed by other engineers for the similar service requests are also important for efficient searching and training less experienced engineers.

What are needed are methods and systems for search support that can make searches more efficient for responding to requests for information by using knowledge of previous searches and searches by other users responding to similar requests.

SUMMARY

In one embodiment, a computer-implemented method for managing service requests from a customer by a business entity includes generating a project folder relating to a first service request received from the customer by the first user, searching a plurality of information sources using keywords relating to the customer request, and storing working documents responsive to the search request in the project folder that is accessible at a future time by at least one of the first user and a second user associated with the business entity wherein the working documents include at least one of the search results, links to documents located by the search, links to portions of documents selected by the user from documents located by the search, and notes entered by the first user. The method further includes organizing the project folder in a database with meta data to describe the task content such as service request name and title, customer name, creation date, support engineer name, models of the service request, etc. such that this user or other users can later locate the working documents during a subsequent search for a second service request similar to the first service request using the project folder such that an amount of time to answer the similar service request is facilitated being reduced.

In another embodiment, a network based system for locating information stored within the system by a business entity in response to a service request by a customer includes a client system including a computer and a user interface, at least one database for storing information, and a server system communicatively coupled to the client system and the database. The server system is configured to receive a service request from the customer, receive information from the client system, the information including search criteria for initiating a search request of a plurality of document sources on the network for documents relating to the service request, store working documents responsive to the search request in a project folder that is accessible at a future time by at least one of the first user and a second user associated with the business entity wherein the working documents include at least one of the search results, links to documents located by the search, links to portions of documents selected by the user from documents located by the search, and notes entered by the first user, and organize the project folder in a database using database with meta data to describe the task content such that at least one of the first user and the second user can later locate the working documents during a subsequent search for a second service request similar to the first service request using the project folder such that an amount of time to answer the similar service request is facilitated being reduced.

In yet another embodiment, a method for managing information search results includes receiving a first service request by a business entity from a first customer of the business entity, generating a project folder relating to first service request, searching a plurality of information sources using keywords relating to the customer request by a first user of the business entity, and storing working documents responsive to the search request in the project folder wherein the working documents include at least one of the search results, links to documents located by the search, links to portions of documents selected by the user from documents located by the search, and notes entered by the first user. The method further includes receiving a second service request by the business entity from at least one of the first customer and a second customer wherein the second service request is substantially similar to the first service request, and searching the plurality of information sources using the project folder by at least one of the first user and a second user associated with the business entity such that an amount of time to answer the similar service request is facilitated being reduced.

BRIEF DESCRIPTION OF THE DRAWINGS

FIGS. 7A-7B are an exemplary screen image of the user interface shown in FIG. 4 used to initiate a document search;

DETAILED DESCRIPTION

Service and support engineers, among others that provide customer support for a business entity respond to service requests daily, responding to tens of thousands of service requests every year. Many of the service requests are similar in that the customers request information for the same components and/or systems. Accordingly, many of the searches for information used to respond to the service requests are performed repetitively. The present disclosure describes methods and systems that permit a user to reuse previous search results in an efficient manner to facilitate performing the searches in less time and responding to the customer service request in a shorter amount of time. The task based search tool described herein permits the user to view past search trails and results for previous service requests, and resolve the service requests faster, improving response time and efficiency. The disclosure further describes a "project" concept for searches, and aggregates the search activities including queries, document collection, and note-taking in a project object for each task that is shared amongst all users.

Figure 1:
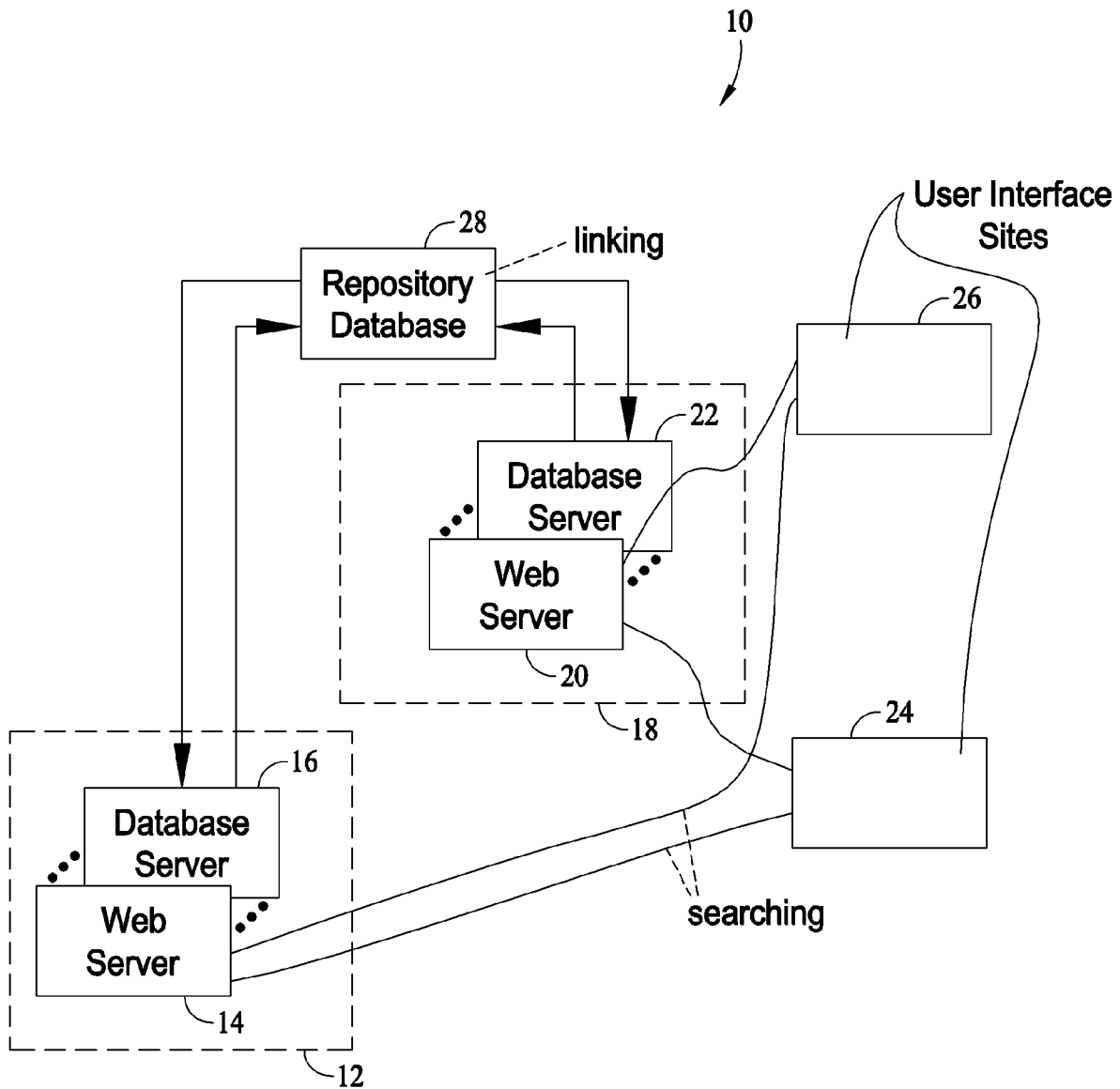
FIG. 1 is a block diagram of an embodiment of a system for task-based searching of information sources in accordance with an embodiment of the present disclosure.

FIG. 1 is a block diagram of an embodiment of a system 10 for task-based searching of information sources in accordance with an embodiment of the present disclosure. System 10 includes a server site 12 that includes a web server 14 and a database server 16. System 10 further includes a server site 18 that includes a web server 20 and a database server 22. System 10 also includes user interface sites 24 and 26. System 10 further includes a repository database 28. User interfaces sites 24 and 26 include computers, including, for example and without limitation, personal computers (PCs) capable of accessing a network such as the web. User interface sites 24 and 26 are connected to any of server sites 12 and 18, potentially through the network. Server sites 12 and 18 are capable of reading data from and writing data to data repository database 28.

Repository database 28 includes product data such as, without limitation, design drawings, maintenance records, technical manuals, and regulatory directives for systems, components, and parts of for example, an aircraft. Repository database 28 further includes project data such as a project name, an origination date of the project, a status of the project, a model number to a product that the project pertains, an Air Transport Association (ATA) System Identification chapter number, and a customer identification number for the project. Repository database 28 may also include models such as CAD models, layouts, engineering drawings, and product structure data. Repository database 28 includes commercial information such as supplier and consumer information for various parts and products. Repository database 28 includes images, multi-media and product commissioning and in-service test results.

Figure 2:
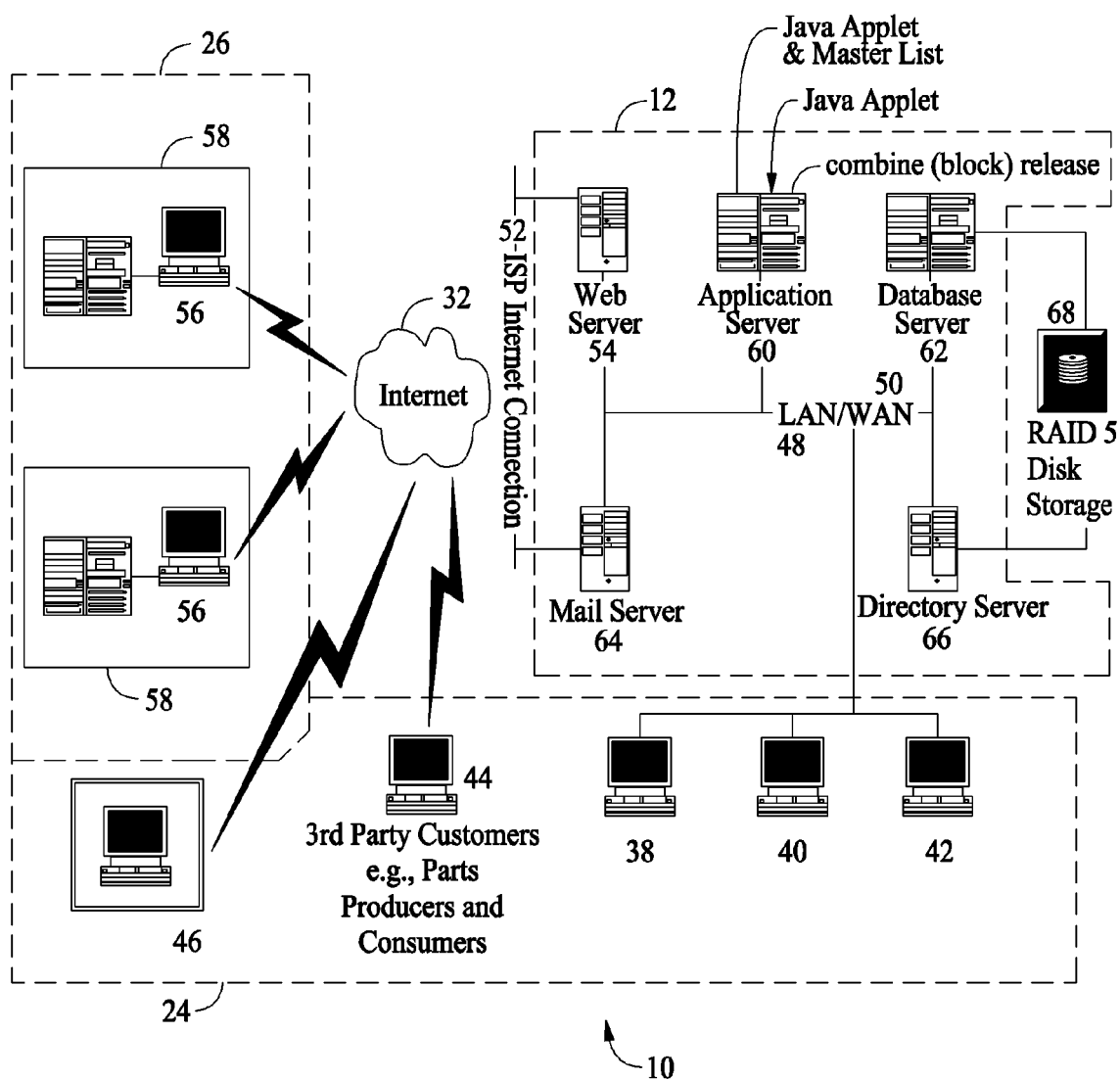
FIG. 2 is a detailed block diagram of an embodiment of a system for task-based searching of information sources in accordance with an embodiment of the present disclosure.

FIG. 2 shows a detailed block diagram of an embodiment of a system 10 for task-based searching of information sources. System 10 includes user interface sites 24 and 26, and server site 12. Internet web 32 may be used to interconnect any of a plurality of user interface sites 24 and 26 to a plurality of server sites, for example, server site 12. Computers 38, 40, 42, 44, and 46 of user interface site 24 are connected to server site 12 via web 32, or potentially via more direct LAN/WAN connections, as exemplified by a LAN connection 48 and a WAN connection 50. If connected via web 32, internet service provider (ISP) connections 52 provide access from computers 38, 40, 42, 44, and 46 of user interface site 24 to web servers, such as for example, web server 54, of server site 12. Computers 56 of user interface site 26 are connected to server site 12 in a similar manner as computers 38, 40, 42, 44, and 46 of user interface site 24 are connected to server site 12.

Computers 56 are a part of a Technical Data Search Engine system (TDSE), such as each of TDSE systems 58. As an example, computers 56 of user interface site 26 are located within an Operations Center or Service Engineering Group. In the example, computers 38, 40, 42, 44, and 46 of user interface site 24 are located within the engineering divisions and used by engineers with permissions for access to system 10. Server site 12 includes an application server 60, a database server 62, a mail server 64, and a directory server 66. Any of servers 54, 60, 64, and 66 are connected to a data repository 68 via database server 62. The repository data stored within data repository 68 is the same as the repository data stored within repository database 28.

Any of servers 54, 60, 62, 64, and 66 execute the methods for a collaborative task-based search model. The methods for the task-based search model include performing document management functions, which include searching for and selecting the repository data from data repository 68, creating the repository data for optional storage into data repository 68, editing the repository data, and retrieving the repository data from data repository 68. Moreover, the document management functions include linking the repository data within data repository 68, and organizing the data in accordance with database with meta data to describe the task content received from users and searching for information relating to one or more customer service requests. In the exemplary embodiment, the meta data used to describe the task content received from users may include at least one of but is not limited to a service request name and title, a customer name, a creation date, a support engineer name, and a model number of the service request.

The project management functions also include, but are not limited to, receiving service requests directly from customers or from the customer through input by a user, receiving search criteria from the user to initiate a search of data sources selected by the user, generating a project folder to store search results that are determined to be relevant to the service request by the user. Additionally, the user may select portions of documents to insert into a note area of the database and associated with the project folder to further specify the relevance of certain search results. The project folder is accessible to other users who may receive similar service requests in the future so that previous searching may be reused to facilitate responding to the subsequent service request in a shorter amount of time than the first service request.

Figure 3:
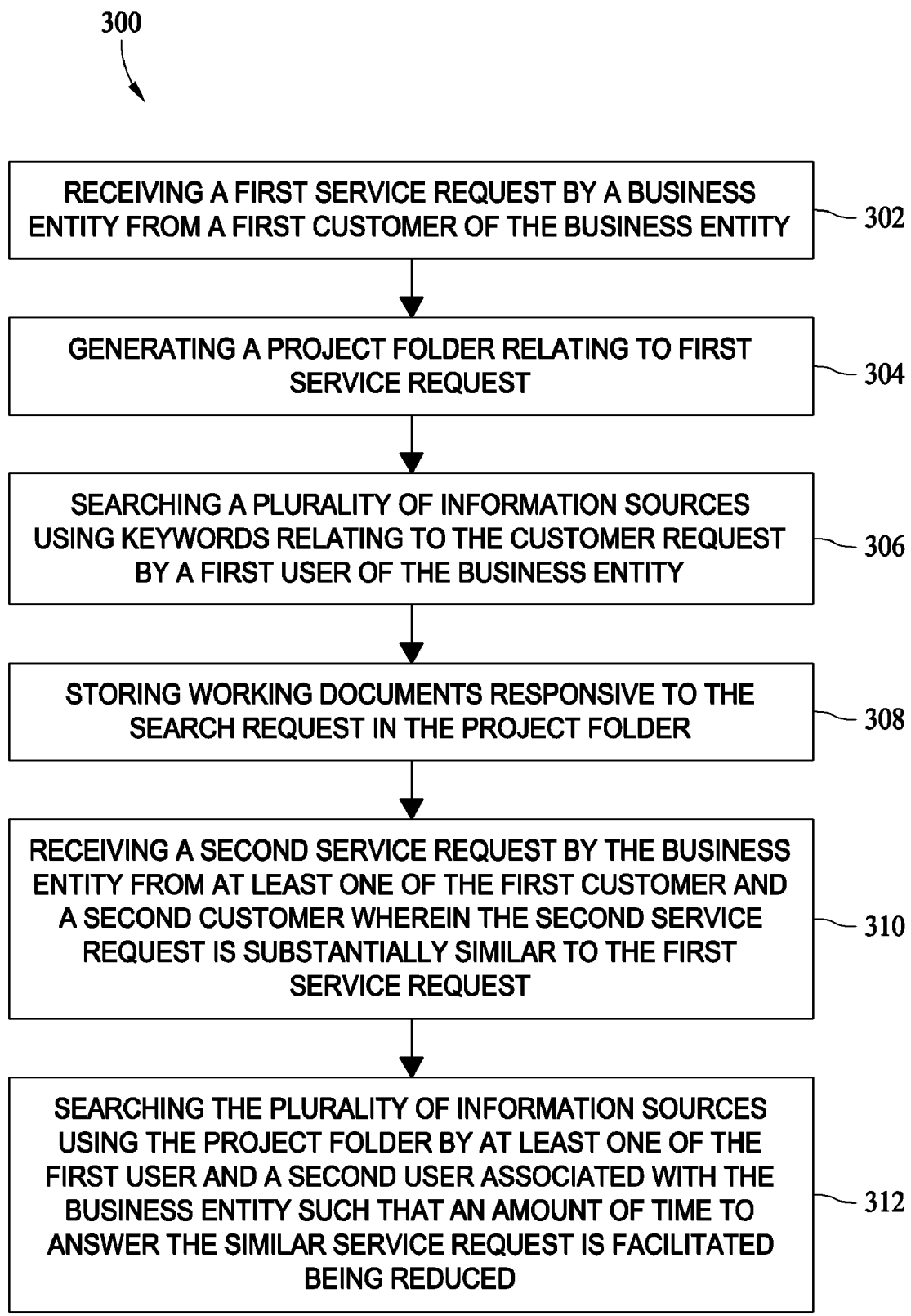
FIG. 3 is a flow diagram of an exemplary method of managing information search results in accordance with an embodiment of the disclosure.

FIG. 3 is a flow diagram of an exemplary method 300 of managing information search results in accordance with an embodiment of the disclosure. Method 300 includes receiving 302 a first service request by a business entity from a first customer of the business entity, generating 304 a project folder relating to first service request. In the exemplary embodiment, the project folder is automatically generated from data in the service request that is entered by the customer. In an alternative embodiment, the project folder is manually generated from data in the service request that is entered by a first user of the business entity. Method 300 further includes searching 306 a plurality of information sources using keywords relating to the customer request by a first user. Method 300 also includes storing 308 working documents responsive to the search request in the project folder wherein the working documents include at least one of the search results, links to documents located by the search, links to portions of documents selected by the user from documents located by the search, and notes entered by the first user, receiving 310 a second service request by the business entity from at least one of the first customer and a second customer wherein the second service request is substantially similar to the first service request, and searching the plurality of information sources using the project folder by at least one of the first user and a second user associated with the business entity such that an amount of time to answer the similar service request is facilitated being reduced.

Figure 4:
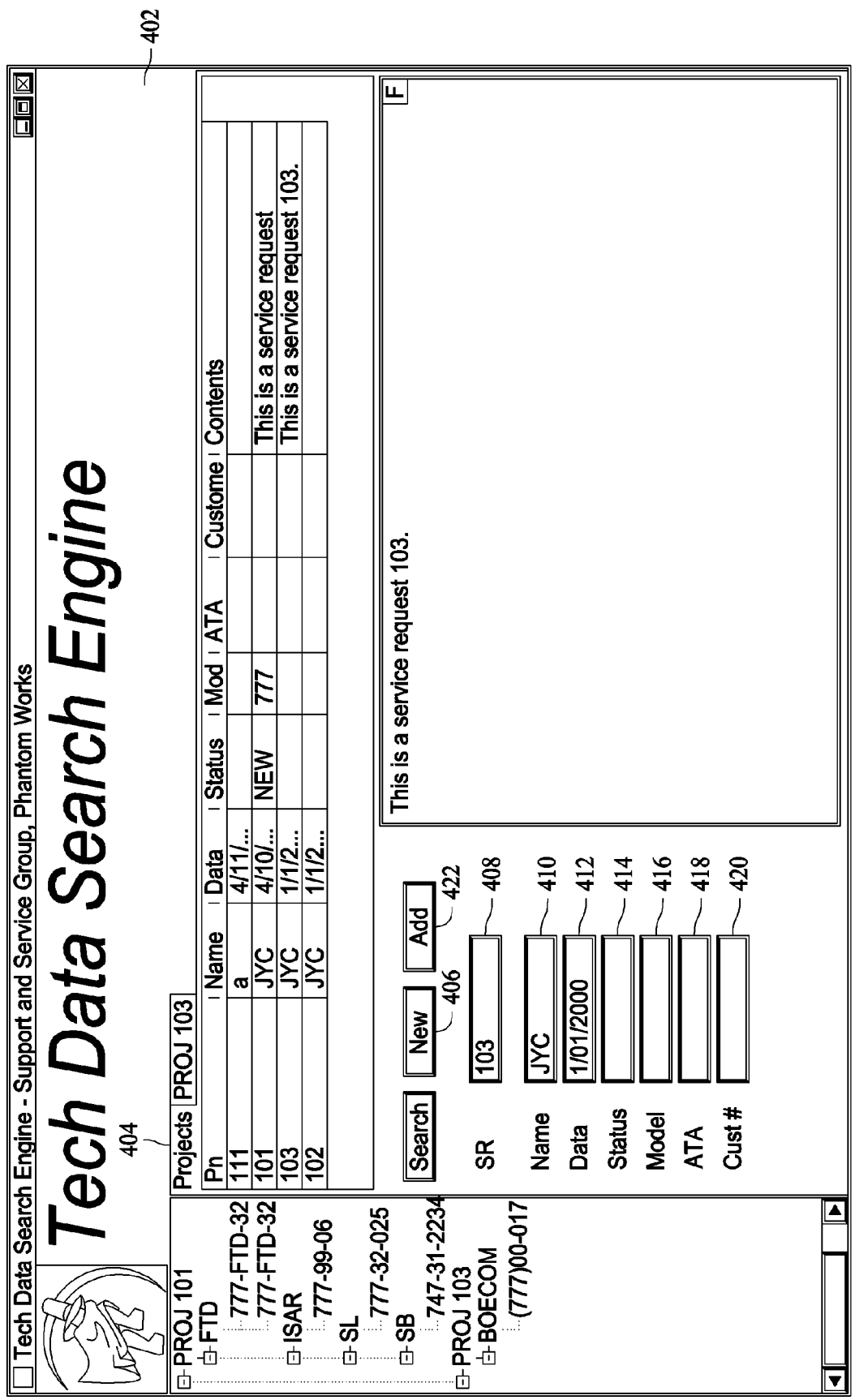
FIG. 4 is an exemplary screen image of a user interface 402 that may be used with system 10 shown in FIG. 1.

FIG. 4 is an exemplary screen image 400 of a user interface 402 that may be used with system 10 (shown in FIG. 1). When the TDSE application begins execution, a user is prompted to sign on, for example, using a network single sign-on. If successful, the user interacts with the application through a Projects Screen and a Search Screen. The Projects Screen permits the user to generate, search, and review prior projects. The Search Screen permits the user to search and work on a specific project. A Data Sources Dialog Window within the Search Screen allows the user to direct the scope of a search by specifying the data sources for the search.

The TDSE application is organized around the concept of a project. The user creates a project in response to a particular search interest for example, a service request for a customer. A user can also initiate searches or generate notes. From the search results, a user can associate reference materials with a project. Queries and Notes are referred to as project actions. Such Queries and Notes are saved and can be recalled for later review at any time.

The TDSE application is used to look up information from a variety of data sources so that a user can simultaneously and selectively access relevant documents. Based on a single user input, multiple searches are initiated. Results from diverse data sources are then aggregated, sorted, ranked, and presented consistently and coherently to the user.

A project may be added automatically by an incoming service request such as via an email from the customer. TDSE automatically receives and parses the data in the email that is entered by the customer. A project may also be generated manually by the user in response to a service request from the customer via for example, a telephone call. To add a project, the user selects a "Projects" tab 404 and selects a "New" button 406. The user then fills in data input fields presented on user interface 402. Specifically, the user enters a unique project name in an "SR" field 408 comprising alphanumeric characters. Optional fields may also be filled in with data that may be available at the time the project is originated or may be filled in at a later time when details of the service request are made clear. To fill in any optional fields, the user enters information in a "Name" field 410, a "Date" field 412, a "Status" field 414, a "Model" field 416, an Air Transport Association (ATA) System Identification chapter number in an "ATA" field 418, and a customer identification number for the request in a "Customer #" field 420. To initiate the addition process, the user selects an "Add" button 422.

Figure 5:
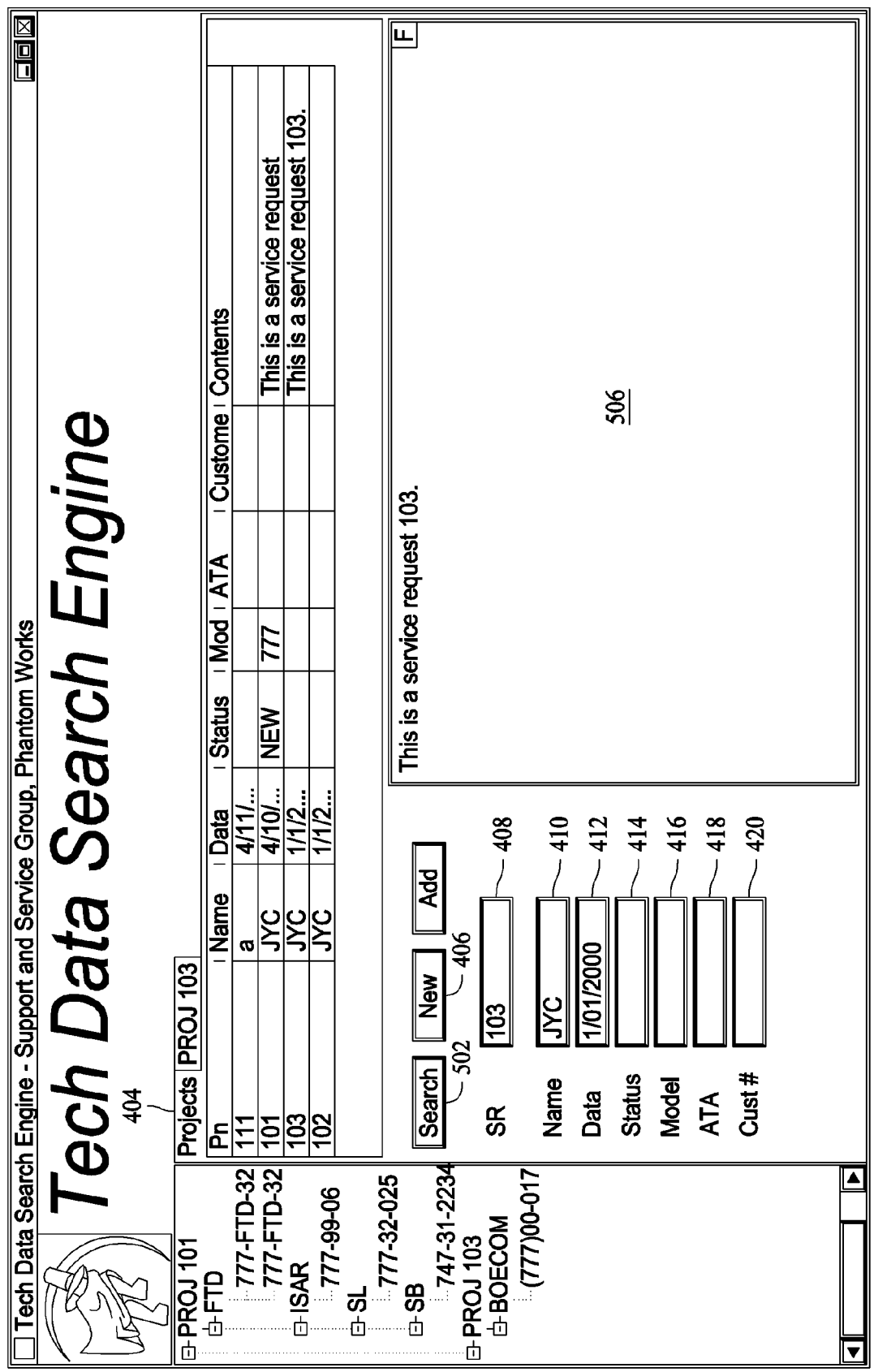
FIG. 5 is an exemplary screen image of the user interface shown in FIG. 4 used to search for existing projects.

FIG. 5 is an exemplary screen image 500 of user interface 402 (shown in FIG. 4) used to search for existing projects. To search for existing projects, the user selects "Projects" tab 404 and "New" button 406. The user then fills in any of fields 408-420 to narrow the search leaving any blank if the information for that field is not known. To initiate a search process the user selects a "Search" button 502.

Figure 6:
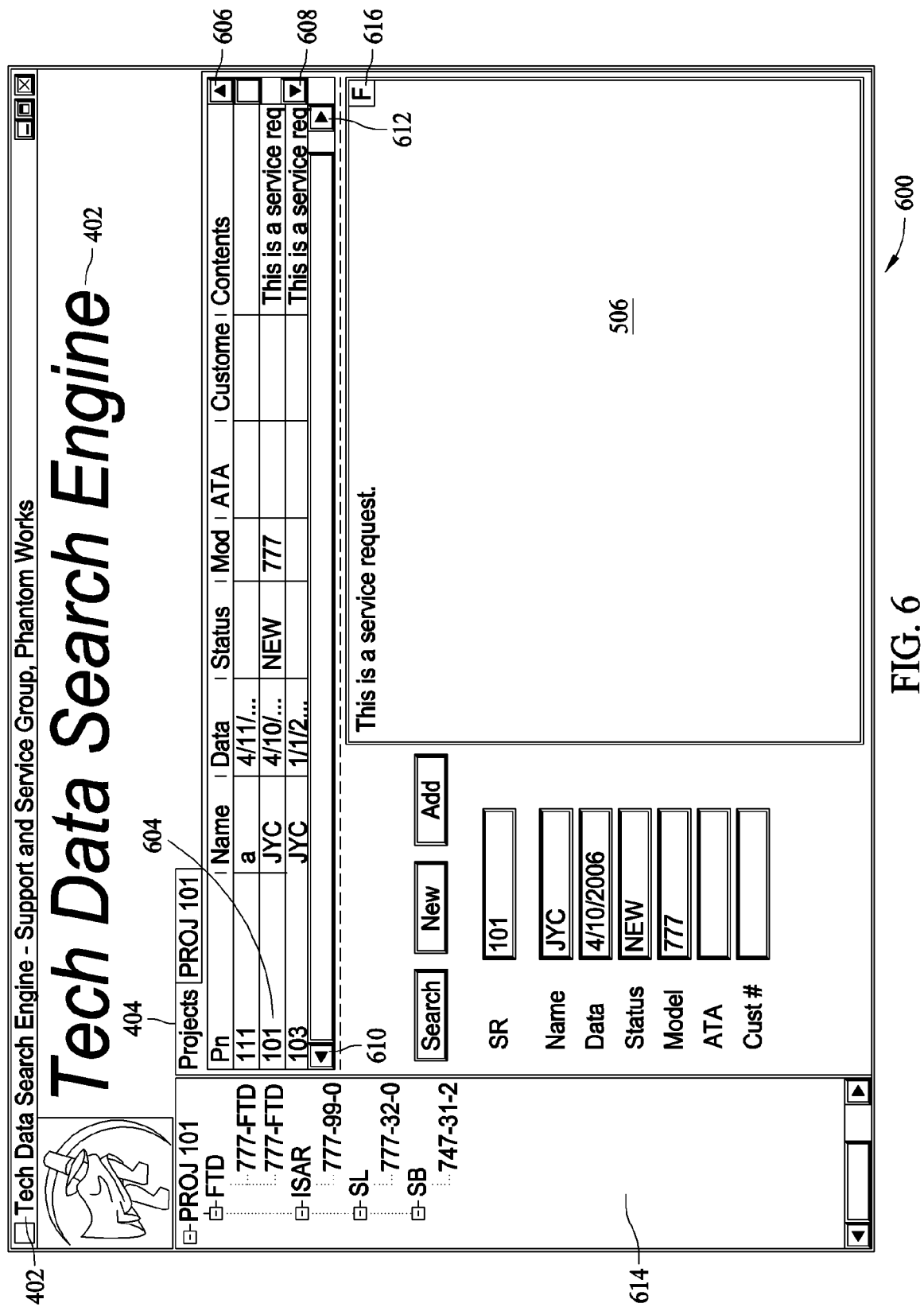
FIG. 6 is an exemplary screen image of the user interface shown in FIG. 4 used to view and select a project.

FIG. 6 is an exemplary screen image 600 of user interface 402 (shown in FIG. 4) used to view and select a project. To view and select a project, the user selects "Projects" tab 404. The available projects are displayed in a projects box 602. To view a project, the user selects a row 604 in projects box 602 containing the project of interest. Information related to the desired project is displayed in a project work area 506 (shown in FIG. 5) below projects box 602. To view more projects the user selects an "Up" arrow 606 to scroll up or selects a "Down" arrow 608 to scroll down. To view more information, the user can select a "Left" arrow 610 to scroll left or select a "Right" arrow 612 to scroll right. To select a project the user selects row 604 in projects box 602 containing the project of interest by doubling left clicking or equivalent on row 604. The user may also click and hold the left mouse button on row 604 and drag an icon of the desired project to project pane 614 on the left portion of user interface 402 (shown in FIG. 4) and then release the left mouse button or equivalent. To view the project contents in a separate window, the user selects an "F" button 616.

Figure 7A:
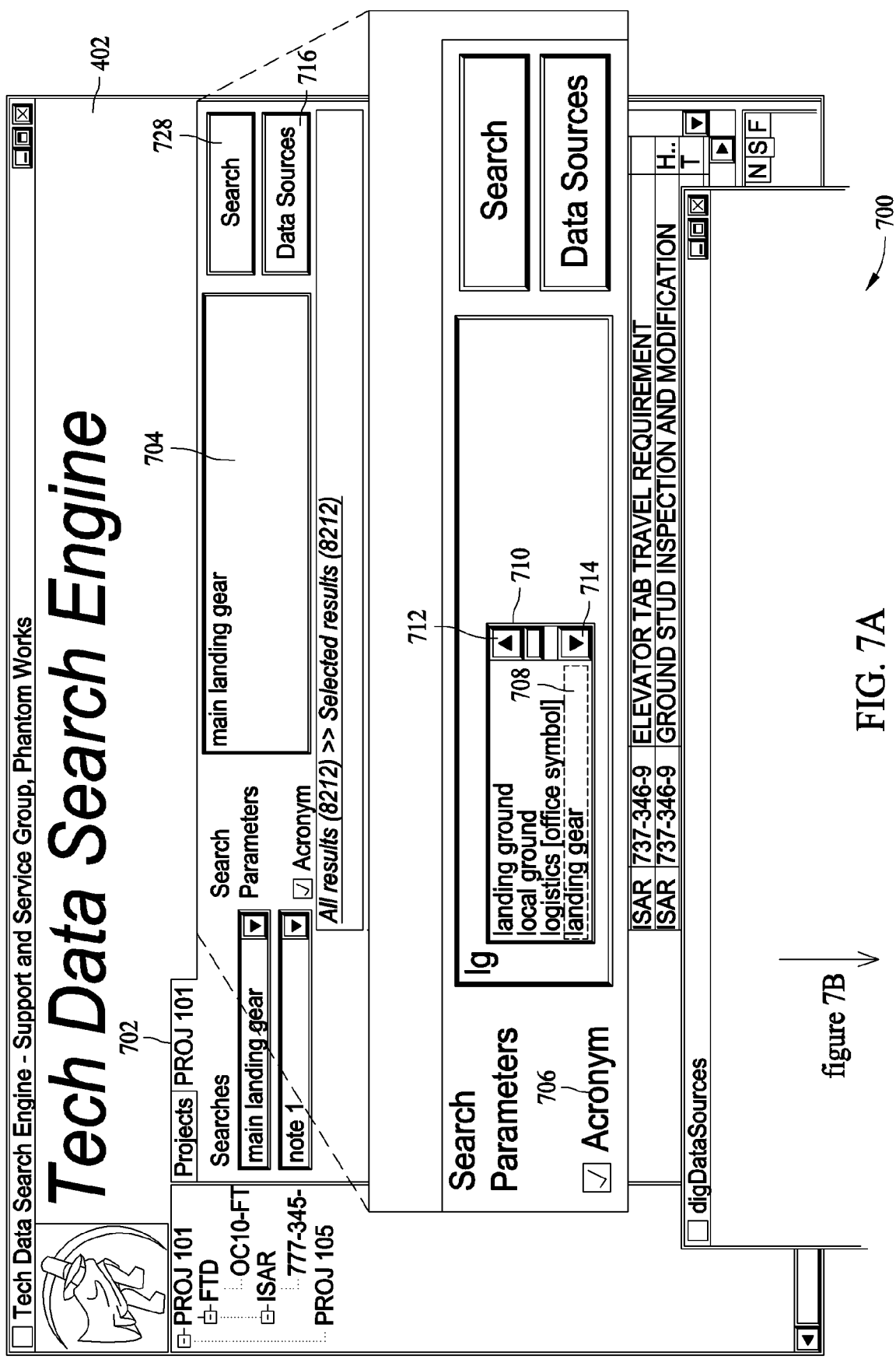

FIGS. 7A-7B are an exemplary screen image 700 of another embodiment of user interface 402 (shown in FIG. 4) used to initiate a document search. To initiate the search, the user selects a "PROJ xxx" tab 702 where xxx represents the project name. The user then fills in search keywords the user has determined will facilitate locating the documents containing the proper information relating to a service request receives from a customer in a "Search Parameters" area 704. To enable acronym support, the user selects an acronym check box 706. The user selects acronym check box 706 to leave the box unchecked to disable acronym support. When enabled, an acronym expansion list 708 is displayed in a drop down box 710 when a series of letters that represents an acronym is entered into "Search Parameters" area 704. The user selects an up arrow 712 or down arrow 714 to select the proper expansion. The user then presses the "enter" key to exit drop down box 710 with the selection or presses a "cancel" key to exit without a selection.

To select or unselect data sources to be searched, the user selects a "Data Sources" button 716 and a data sources selection window 718 is displayed. The user determines which data sources 720 are used for the search by selecting a check box 722 associated with the determined data sources. The user selects a checked box to deselect the associated data source 720 to exclude data source 720 from the search. The user may also select a check box 724 corresponding to a desired scenario to select a group of data sources by scenario. Such scenarios include but are not limited to aircraft information, part information, troubleshooting, part interchangeability, part availability, and part information. The user then selects an "OK" button to exit data sources selection window 718. To initiate the search the user selects a "Search" button 728. The label on "Search" button 728 changes to "Stop Search" while the search is executing. When all the selected searches are completed, the label of "Search" button 728 changes back to "Search."

Figure 8:
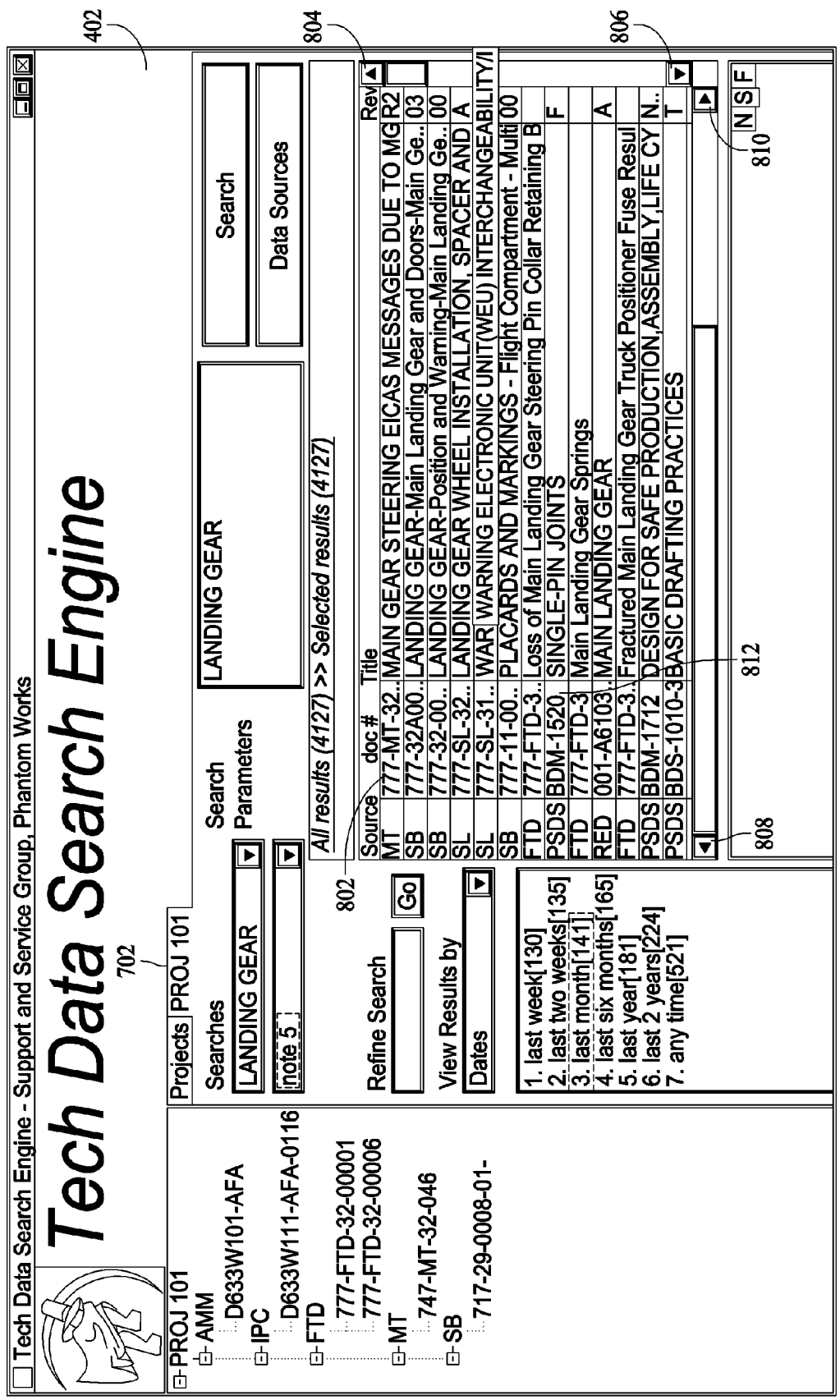
FIG. 8 is an exemplary screen image of the user interface shown in FIG. 4 used to view search result documents that are responsive to a search.

FIG. 8 is an exemplary screen image 800 of another embodiment of user interface 402 (shown in FIG. 4) used to view search result documents that are responsive to a search. To view search result documents, the user selects "PROJ xxx" tab 702 where xxx represents the project name. To view a document, the user selects a row 802 containing the desired project name by for example, double clicking on the left mouse button with the cursor over row 802. To view more documents, the user selects an "Up" arrow 804 to scroll up or a "Down" arrow 806 to scroll down. To view still more information, the user selects a "Left" arrow 808 to scroll left or a "Right" arrow 810 to scroll right. To associate a document to a project, the user selects the document to highlight a row 812, drags the document icon to the desired project on project pane 614 (shown in FIG. 6), and releases the mouse button when the cursor arrow is over the desired project.

Figure 9A:
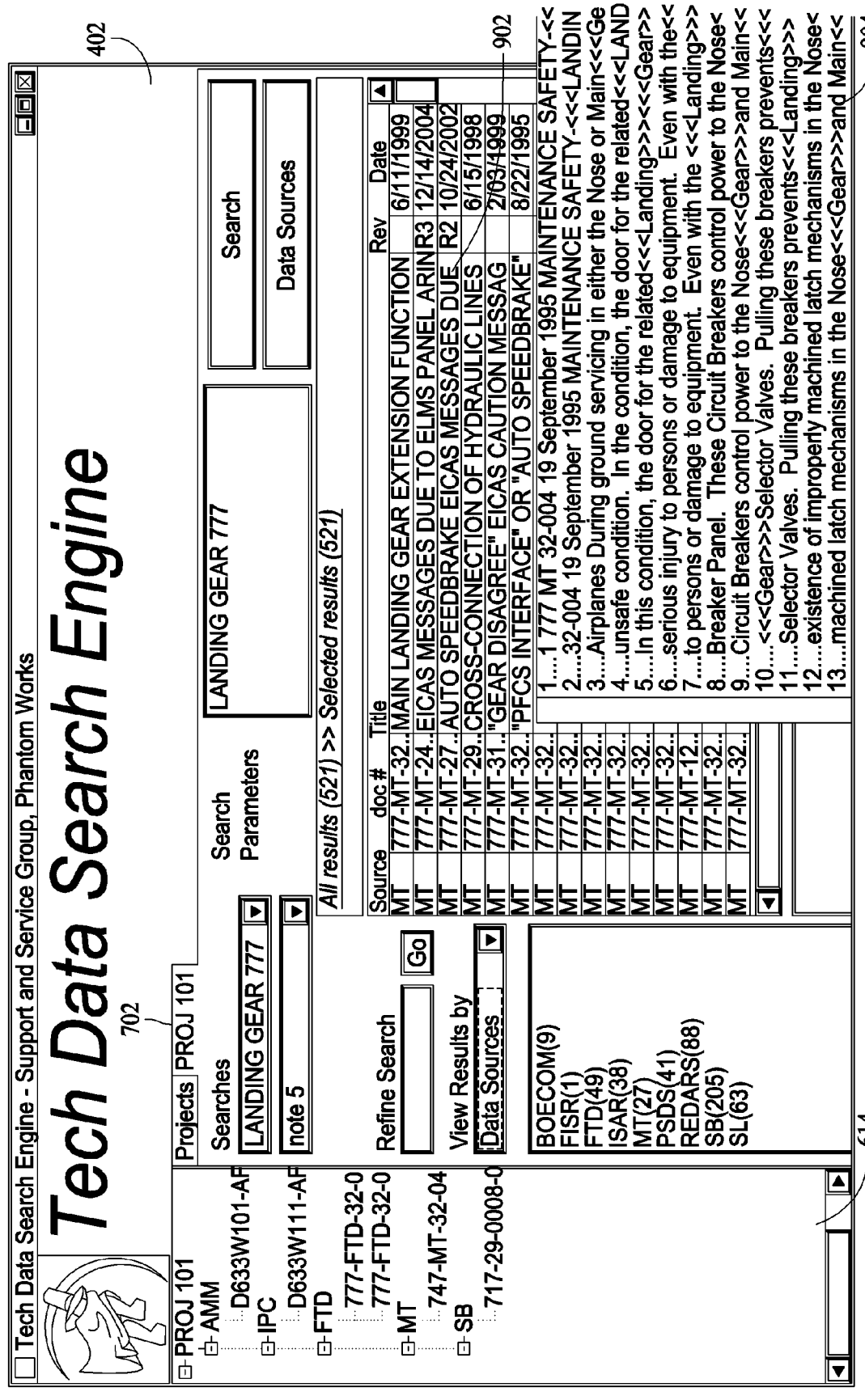
FIGS. 9A-9B are an exemplary screen image of the user interface shown in FIG. 4 used to drill down into documents that are the results of a search.
Figure 9B:
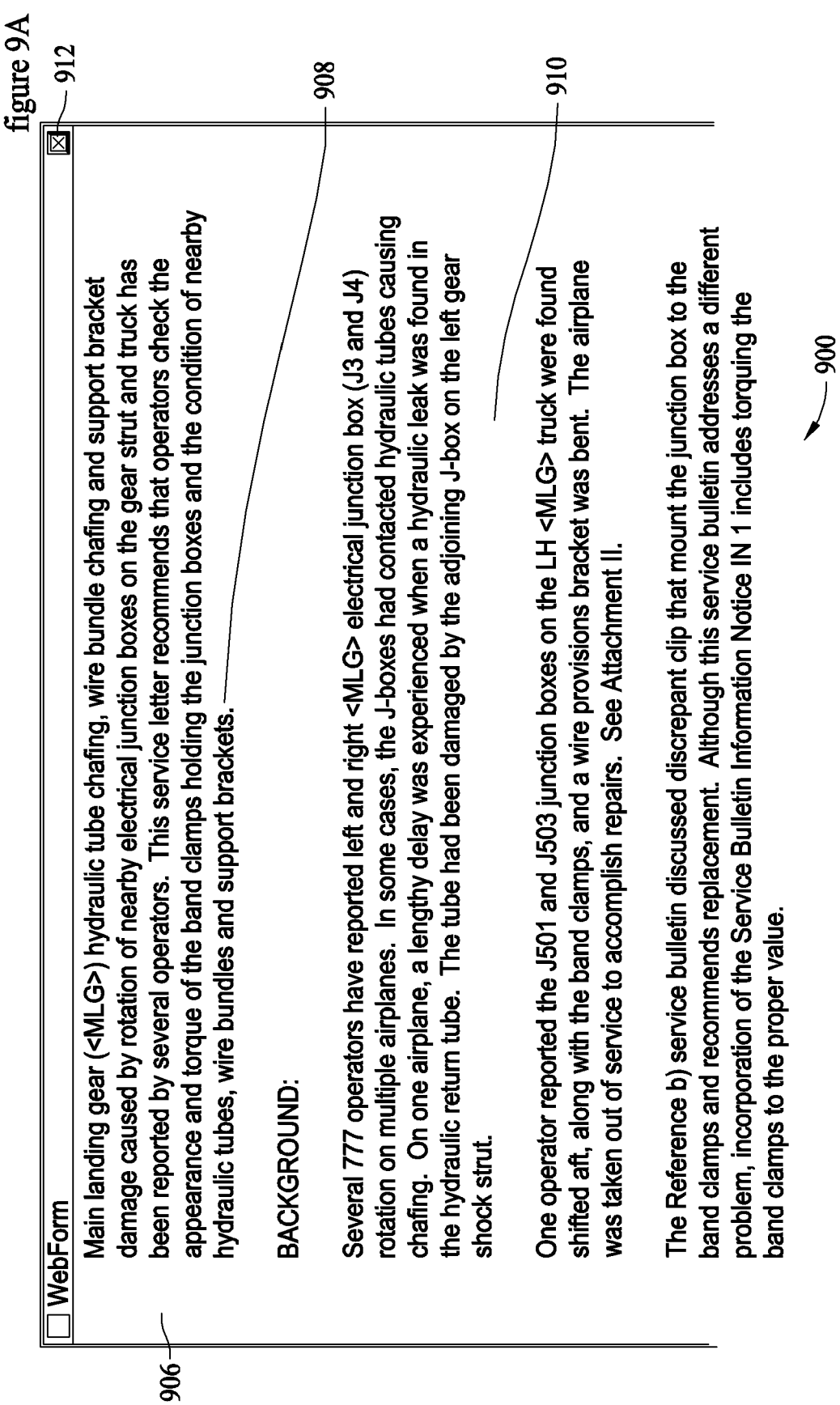

FIGS. 9A-9B are an exemplary screen image 900 of another embodiment of user interface 402 (shown in FIG. 4) used to drill down into documents that are the results of a search. As used herein, "snippets" are small segments of the document containing the search text. To view snippets in a document, the user clicks on the right mouse button over the desired document 902. A pop up window 904 opens with the snippets from the chosen document. A left click on any snippet will open the HTML version of the document in a separate window 906. To navigate within a document, the user selects a "≦" character to go to a previous occurrence 908 of a search word within the document or selects a "≧" character to go to the next occurrence 910 of a search word within the document. To close the document, the user selects an "X" button 912.

Figure 10:
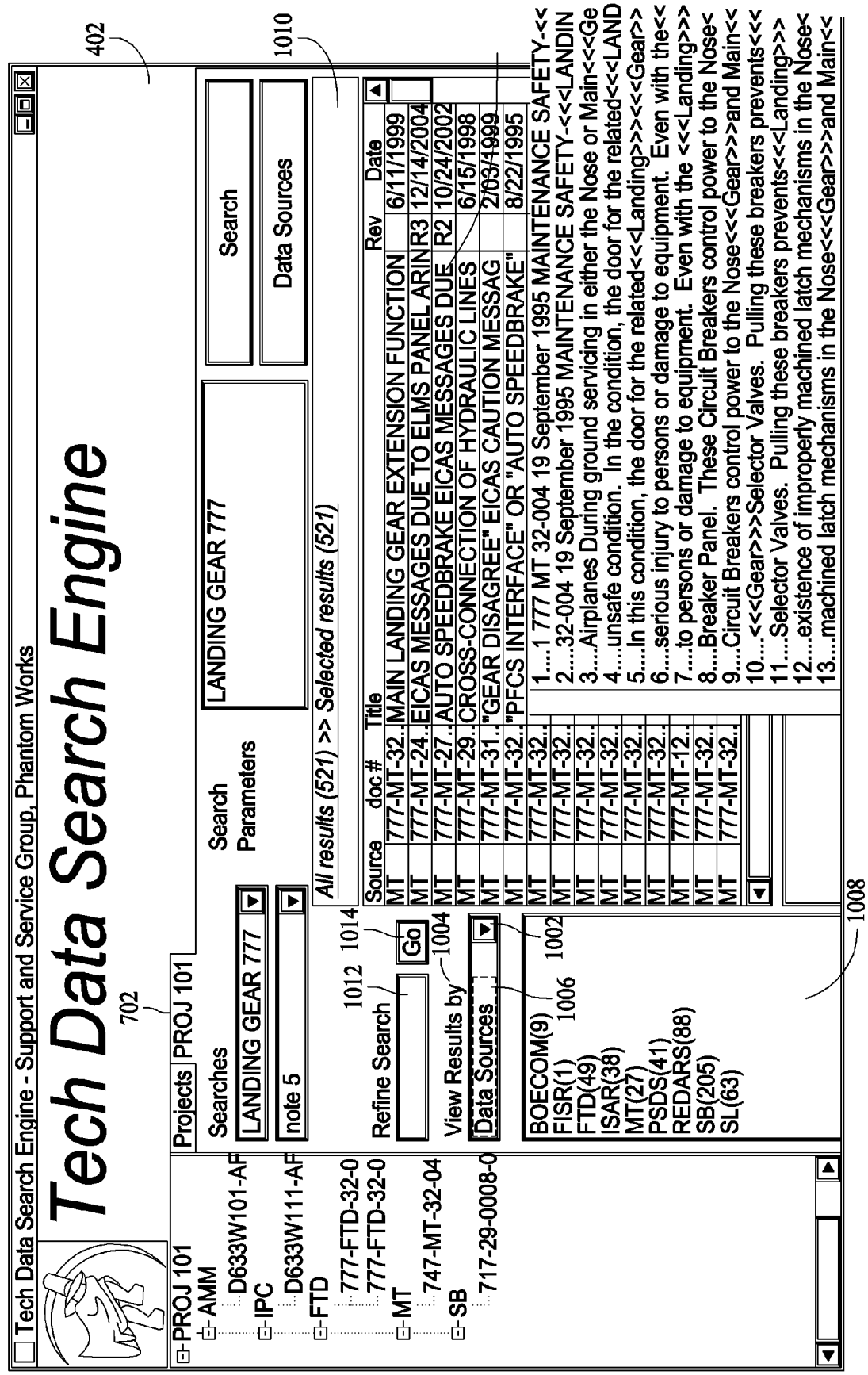
FIG. 10 is an exemplary screen image of the user interface shown in FIG. 4 used to drill down into documents that are the results of a search using a faceted drill down that permits the user to view the search results from different perspectives or facets.

FIG. 10 is an exemplary screen image 1000 of another embodiment of user interface 402 (shown in FIG. 4) used to drill down into documents that are the results of a search using a faceted drill down that permits the user to view the search results from different perspectives or facets. To drill down, the user selects a "Down" arrow 1002 of a "View Results by" box 1004. The user selects a category 1006, for example, but not limited to data sources, ATA chapter, models, or dates to narrow the search results to the chosen category. The text of the selected category will be italicized and set in bold. The user selects a desired criterion 1008 for that category to view documents under that category. A total number of documents, the selected categories, and the number of selected documents by categories and criteria are displayed in a results pane 1010. For example, if the selected category is data sources, a name or acronym for the data sources that were searched and contained the search criteria is displayed in results pane 1010 along with a number of hits of the search criteria found in the data source. In the exemplary embodiment, available data sources include but are not limited to, BOECOM (Boeing Communications), FISR, (Fleet Issues Summary Report), FTD, (Fleet Team Digest), ISAR, (In-Service Activity Report), MT, (Maintenance Tip), PSDS, (Product Standards Data System), REDARS, (Reference Engineering Data Automated Retrieval System), SB, (Service Bulletin), and SL, (Service Letter). When category ATA chapter is selected, the available criteria includes, but is not limited to 05: Time Limits, Maintenance Checks(7), 11: Placards And Markings (1), 12: Servicing(9), 20: Standard Practices—Airframe(3), 21: Air Conditioning(2), 22: Auto Flight(2), 24: Electrical Power(9), 25: Equipment/Furnishings(2), 26: Fire Protection (2), 27: Flight Controls(23), 28: Fuel(6), 29: Hydraulic Power (29), 30: Ice And Rain Protection(1), 31: Indicating/Recording System(4), 32: Landing Gear(339), 33: Lights(9), 34: Navigation(2), 51: Structures And Standard Practices(3), 52: Doors(10), 53: Fuselage(17), 57: Wings(30), 71: Power Plant (Package)(1), 72: Engine (Internals)(2), 73: Engine Fuel And Control(1), 76: Engine Controls(1), 77: Engine Indicating(1), and 78: Exhaust(5). When category Models is selected, the available criteria includes, but is not limited to 707(9), 717(3), 737(270), 747(34), 757(3), 767(10), 777(189), and MD8(3). When category Dates is selected, the available criteria includes, but is not limited to last week(2), last 2 weeks(9), last month(18), last 6 months(89), last year(211), last 2 years (145), any time(47). In the above examples, the number following the criteria in parentheses indicates the number of search hits found in the criterion. The user can then select the data source for further analysis. To unselect the category, double click on the criteria again. The user continues to select additional categories to further decrease the scope of the search. As used herein, a "local search" is a search within the current search results. To perform a local search, the user enters one or more additional keyword in a "Refine Search" textbox 1012 and then selects a "Go" button 1014. Only documents containing the words in the "Refine Search" box are displayed.

Figure 11:
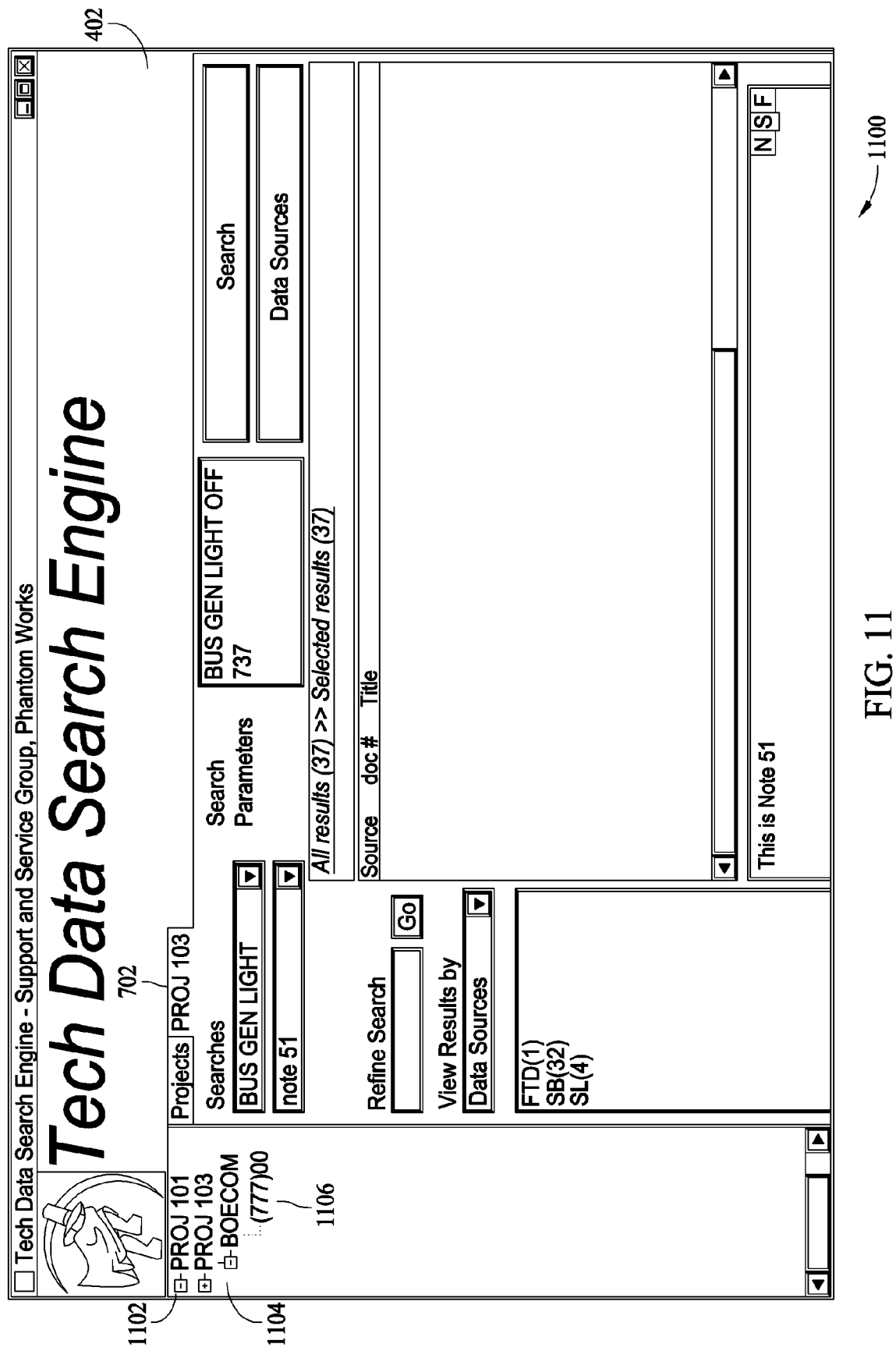
FIG. 11 is an exemplary screen image of the user interface shown in FIG. 4 used to view selected documents.

FIG. 11 is an exemplary screen image 1100 of another embodiment of user interface 402 (shown in FIG. 4) used to view selected documents. To expand a project, the user selects a "+" icon 1102 and to condense a project, the user selects a "−" icon 1104. To view a selected document, the user selects the desired document by, for example, double clicking with left mouse button on the desired document 1106. To delete a selected document, the user right clicks on the desired document and then selects a "Delete" option.

Figure 12:
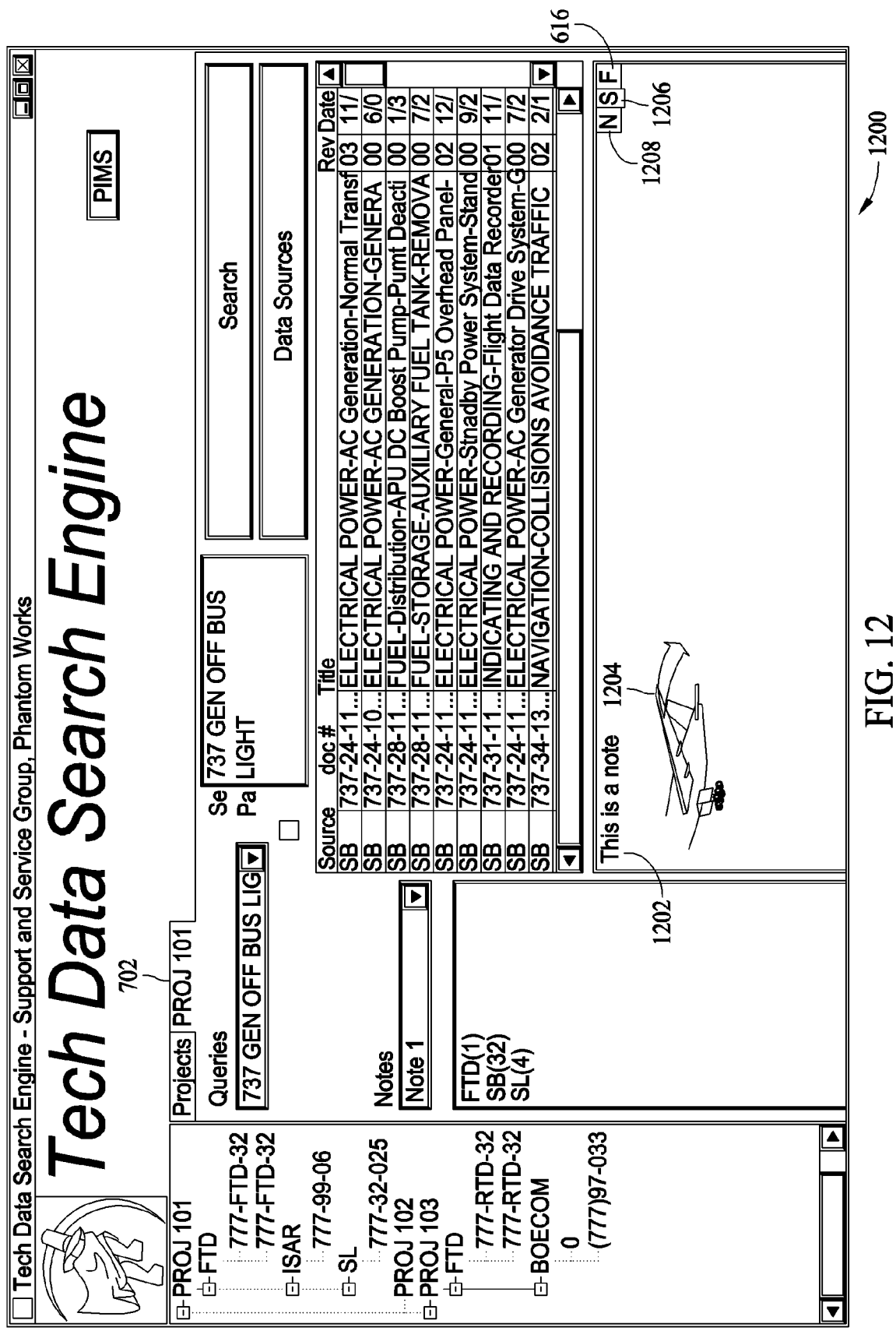
FIG. 12 is an exemplary screen image of the user interface shown in FIG. 4 used to add notes to a project.

FIG. 12 is an exemplary screen image 1200 of another embodiment of user interface 402 (shown in FIG. 4) used to add notes to a project. To add a note, the user selects "PROJ xxx" tab 702 where xxx represents the project name. Notes may be entered directly to a notes area 1202 by typing the desired text in notes area 1202, may be cut from a source document and pasted into notes area 1202 by highlighting the area to copy, pressing "ctrl-c" or right clicks the mouse button and selects the "Copy" option or the equivalent. The user then returns to the TDSE Project Screen, places the cursor at the insertion point 1204, and presses "ctrl-v" or right clicks the mouse button and selects the "Paste" option or the equivalent. To save the new information, the user selects an "S" button 1206. To add a new note, the user selects an "N" button 1208. To view the note in separate window, the user selects "F" button 616 (shown in FIG. 6).

Figure 13:
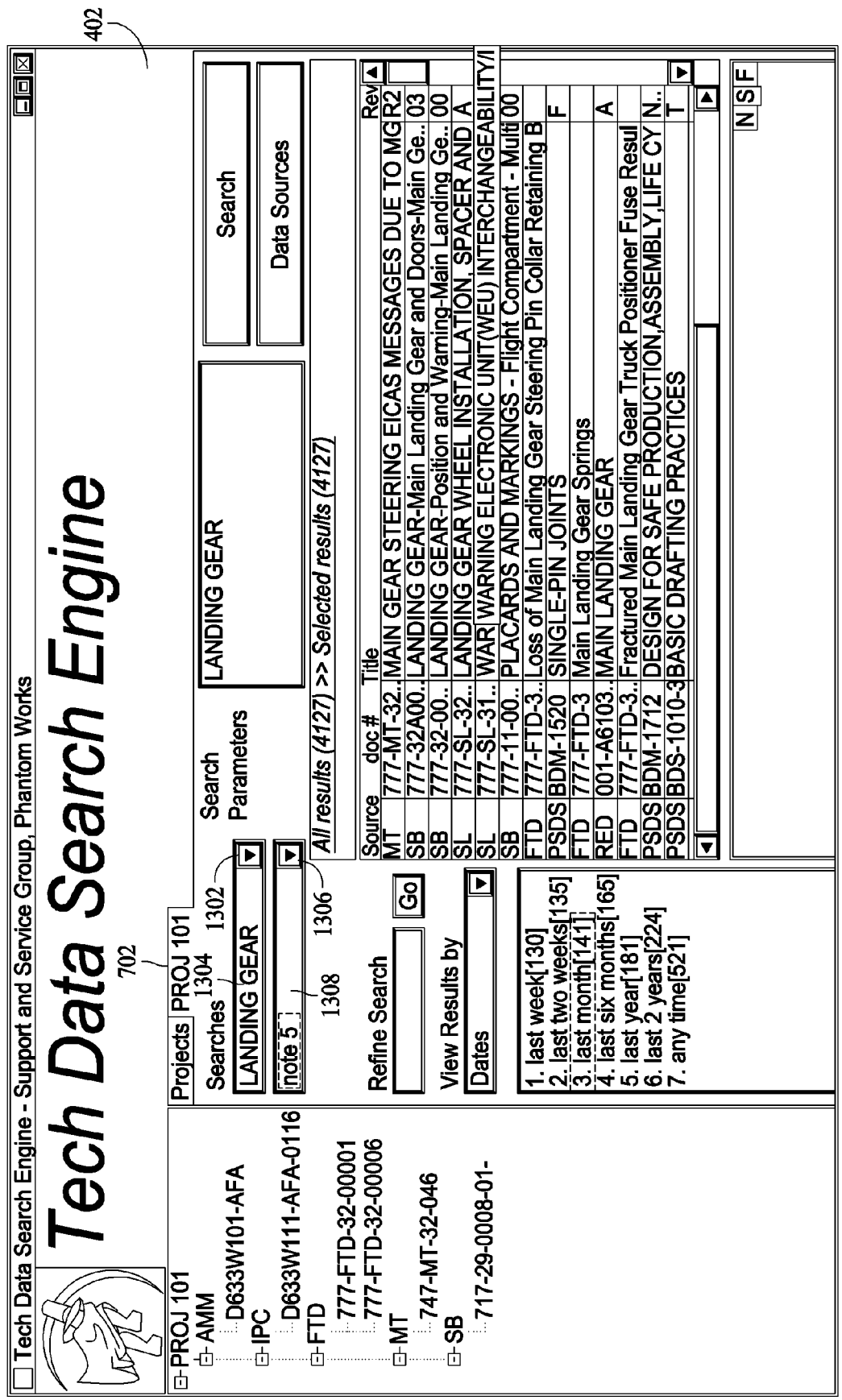
FIG. 13 is an exemplary screen image of the user interface shown in FIG. 4 used to view the history a project.

FIG. 13 is an exemplary screen image 1300 of another embodiment of user interface 402 (shown in FIG. 4) used to view the history a project. To view the history, the user selects "PROJ xxx" tab 702 (shown in FIG. 7) where xxx represents the project name. To view past queries and results, the user selects a "Down" arrow 1302 of a searches box 1304 and then selects the desired query. To view past notes, the user selects a "Down" arrow 1306 of a notes box 1308 and selects the desired note.

The above-described methods and systems for collaborative searching of information for a customer are cost-effective and highly reliable. The methods and systems include performing a search, selecting the results of the search that are most relevant to the customer request, storing the results in a database accessible to a plurality of other users, and using the saved search results in sequent searches for similar customer requests. Accordingly, the methods and systems facilitate reducing engineering search time in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A computer-implemented method for managing aircraft service requests from a customer by a business entity, said method comprising:

electronically generating a project folder using data entered by the customer and included within a first aircraft service request electronically transmitted from the customer to a first user associated with the business entity;

searching a plurality of information sources using keywords entered by the first user and related to the first aircraft service request to identify a plurality of working documents related to the first aircraft service request;

providing the plurality of working documents to the first user;

receiving, from the first user, at least one selection of a portion of a first document of the plurality of documents, the portion of the first document determined by the first user to be relevant to the first aircraft service request;

storing the portion of the first document in the project folder associated with the first aircraft service request, wherein the project folder is accessible at a future time by at least one of the first user and a second user associated with the business entity; and organizing the project folder in a database using meta data that describes the first aircraft service request such that at least one of the first user and the second user can later locate the portion of the first document determined to be relevant to the first aircraft service request during a subsequent search of existing project folders, and use the portion of the first document when responding to a second aircraft service request similar to the first aircraft service request by locating and accessing the project folder associated with the first aircraft service request.

2. A method in accordance with claim 1 wherein generating a project folder comprises the first user associated with the business entity generating a project folder.

3. A method in accordance with claim 2 wherein the first user associated with the business entity generating a project folder comprises the first user entering project folder identifying information including at least one of a project name, a current date, a project status, a model number of the object of the service request, an Air Transport Association (ATA) System Identification chapter number, and a customer identification number for the first service request.

4. A method in accordance with claim 1 wherein searching a plurality of information sources comprises searching at least one of an Internet-based regulatory authority document database, a plurality of network-based electronic documents controlled by the business entity, a plurality of search results previously queried by the first user, a note entered by the first user, and a link to a portion of a document.

5. A method in accordance with claim 1 wherein searching a plurality of information sources comprises selecting at least one information source from a plurality of information sources.

6. A method in accordance with claim 1 wherein searching a plurality of information sources comprises searching a plurality of information sources that are located on respective servers.

7. A method in accordance with claim 1 wherein storing working documents comprises storing the working documents in a database server communicatively coupled to a plurality of client workstations located remotely from the database server and others of the plurality of client workstations.

8. A method in accordance with claim 1 wherein storing working documents comprises storing working documents wherein the working documents include at least one of the search results, links to documents located by the search, links to portions of documents selected by the user from documents located by the search, and notes entered by the first user.

9. A method in accordance with claim 1 further comprising searching the previously stored working documents by the second user in response to the second service request that is similar to the first service request.

10. A method in accordance with claim 1 wherein organizing the project folder in a database comprises organizing the project folder in a database using at least one of a service request name and title, a customer name, a creation date, a support engineer name, and a model number pertaining to the service request such that at least one of the first user and the second user can locate the working documents during a subsequent search for a second service request similar to the first service request by accessing the project folder such that an amount of time to answer the similar service request is facilitated being reduced.

11. A network based system for locating information stored within said system by a business entity in response to a service request by a customer, said system comprising:

a client system comprising a computer and a user interface;

at least one database for storing information; and a server system configured to be coupled to said client system and said database, said server system further configured to:

receive a first service request from the customer;

automatically generate a project folder from data entered by the customer and included in the first service request;

receive information from said client system, said information including search criteria for initiating a first search request of a plurality of document sources on the network for documents related to the first service request;

provide search results to a first user associated with the business entity, the search results including a plurality of working documents;

receive user entered data from the first user that includes at least one of text and a copied selection of a portion of a first document of the plurality of working documents, the user entered data determined by the first user to be relevant to the first service request;

store the user entered data in the project folder, wherein the project folder is accessible at a future time by at least one of the first user associated with the business entity and a second user associated with the business entity; and organize the project folder in a database of project folders using meta data that describes the first service request such that at least one of the first user and the second user can later locate the user entered data during a subsequent search of existing project folders, and use the user entered data when responding to a second service request similar to the first service request such that an amount of time to respond to the similar service request is facilitated being reduced.

12. A system in accordance with claim 11 wherein said at least one database is at least one of a centralized database and a distributed database residing on a plurality of servers.

13. A system in accordance with claim 11 wherein said server system is further configured to prompt the first user associated with the business entity to generate a project folder.

14. A system in accordance with claim 11 wherein said server system is further configured to search at least one of an Internet-based regulatory authority document database, a plurality of network-based electronic documents controlled by the business entity, a plurality of search results previously queried by the first user, text entered by the first user, and a link to the copied selection of a portion of a document.

15. A system in accordance with claim 11 wherein said server system is further configured to parse the first service request from the customer for project folder identifying information including at least one of a project name, a current date, a project status, a model number of the object of the service request, an Air Transport Association (ATA) System Identification chapter number, and a customer identification number for the request.

16. A system in accordance with claim 11 wherein said server system is further configured to search at least one information source selected from a plurality of information sources by the first user.

17. A system in accordance with claim 11 wherein said server system is further configured to store the working documents in a database server communicatively coupled to a plurality of client workstations located remotely from the database server and others of the plurality of client workstations.

18. A system in accordance with claim 11 wherein said server system is further configured to store working documents responsive to the search request in a project folder that is accessible at a future time by at least one of the first user and a second user associated with the business entity wherein the working documents include at least one of the search results, links to documents located by the search, links to portions of documents selected by the first user from documents located by the search, and text entered by the first user.

19. A system in accordance with claim 11 wherein said server system is further configured to search the previously stored working documents in response to a second service request that is similar to the first service request.

20. A method for managing information search results, said method comprising:

receiving a first service request by a business entity from a first customer of the business entity;

generating a project folder relating to the first service request;

storing the project folder in a searchable database using meta data that describes the first service request to identify the project folder;

searching a plurality of information sources using keywords generated by a first user of the business entity that relate to the first service request;

providing search results to the first user, the search results including a plurality of working documents responsive to the first search request;

storing links to portions of the working documents selected by the first user for being relevant to the first service request;

receiving a second service request by the business entity from at least one of the first customer and a second customer wherein the second service request is substantially similar to the first service request; and searching the database using information identifying the second service request to locate the project folder relating to the first service request such that at least one of the first user and a second user associated with the business entity can use the links to portions of the working documents selected by the first user when responding to the second service request and reduce an amount of time to answer the similar service request.

21. A method in accordance with claim 20 wherein generating a project folder comprises automatically generating the project folder from data in the first service request that is entered by the customer.

* * * * *